US005277758A

United States Patent [19]
Brooks et al.

[11] Patent Number: 5,277,758
[45] Date of Patent: *Jan. 11, 1994

[54] METHOD FOR RECYCLING PLASTIC COATED PAPER PRODUCT WASTE AND POLYMERIC FILM

[75] Inventors: Joe G. Brooks, Springdale; Billy D. Goforth, Fayetteville; Charles L. Goforth, Lowell; J. Douglas Brooks, Springdale, all of Ark.

[73] Assignee: Advanced Environmental Recycling Technologies, Inc., Springdale, Ark.

[*] Notice: The portion of the term of this patent subsequent to Jan. 28, 2009 has been disclaimed.

[21] Appl. No.: 854,231

[22] Filed: Mar. 20, 1992

Related U.S. Application Data

[63] Continuation-in-part of Ser. No. 672,832, Mar. 21, 1991, which is a continuation-in-part of Ser. No. 499,718, Mar. 27, 1990, Pat. No. 5,084,135.

[51] Int. Cl.⁵ .......................... D21B 1/14; D21B 1/30
[52] U.S. Cl. .......................... 162/4; 162/191; 162/261; 162/264; 264/117; 264/40.7; 264/40.6; 209/3; 209/10; 209/173; 261/20; 261/24; 261/27
[58] Field of Search .................. 162/4, 5, 191, 261, 162/264; 209/3, 10, 173; 241/20, 24, 27, 28; 264/114, 117, 40.7, 40.6; 425/222

[56] References Cited

U.S. PATENT DOCUMENTS

| | | |
|---|---|---|
| 3,226,343 | 12/1965 | Rhodes . |
| 3,284,282 | 11/1966 | Immel ................................. 162/4 |
| 3,843,060 | 10/1974 | Colburn .............................. 241/24 |
| 4,000,031 | 12/1976 | Acobas ............................... 162/191 |
| 4,092,458 | 5/1978 | Hoffman ............................ 264/140 |
| 4,123,489 | 10/1978 | Kelley ................................ 241/221 |
| 4,134,554 | 1/1979 | Morlock ........................... 241/185.5 |
| 4,160,722 | 7/1979 | Marsh ................................. 162/4 |
| 4,162,768 | 7/1979 | Froats ................................. 162/4 |
| 4,332,748 | 6/1982 | Fremont ............................. 162/5 |
| 4,436,104 | 3/1984 | Kashiwagi .......................... 134/63 |
| 4,751,030 | 6/1988 | Volk, Jr. ............................. 264/40.7 |
| 4,784,595 | 11/1988 | Halter ................................. 264/40.7 |
| 4,830,219 | 5/1989 | Siemann .............................. 264/40.7 |
| 5,084,135 | 1/1992 | Brooks et al. ....................... 162/4 |

FOREIGN PATENT DOCUMENTS

| | | |
|---|---|---|
| 695881 | 10/1964 | Canada ............................... 162/4 |
| 3002061 | 7/1981 | Fed. Rep. of Germany ........ 241/20 |
| 1228276 | 4/1971 | United Kingdom ................. 162/4 |

OTHER PUBLICATIONS

Felton, A. J., "The Process and Economics of Polymer-Coated Wood Fiber Recovery", Tappi, May 1975, vol. 58; No. 5, pp. 71-73.

Primary Examiner—W. Gary Jones
Assistant Examiner—Todd J. Burns
Attorney, Agent, or Firm—Ross, Howison, Clapp & Korn

[57] ABSTRACT

A method for recycling waste plastic material, from polymeric film or hydropulper waste, including plastic and cellulosic fiber or organic contaminants. The method includes the steps of introducing the waste plastic material into a size reduction unit, and reducing the size of the waste plastic material to particles having a maximum dimension ranging between about 1 inch and about 8 inches; mechanically hammering and rubbing the plastic material for separating a portion of the cellulosic fiber from the plastic; separating another portion of the cellulosic fiber from the plastic by flotation with agitation; further reducing the particle size of the plastic to a maximum dimension of about ½ inch; dewatering the plastic; drying the plastic to a moisture content of less than about 10 weight percent; and rolling the plastic into pellets.

14 Claims, 3 Drawing Sheets

METHOD FOR RECYCLING PLASTIC COATED PAPER PRODUCT WASTE AND POLYMERIC FILM

CROSS-REFERENCE TO RELATED APPLICATION

This application is a continuation-in-part of U.S. patent application Ser. No. 07/672,832, filed Mar. 21, 1991, which is a continuation-in-part of U.S. patent application Ser. No. 07/499,718, filed Mar. 27, 1990, which issued as U.S. Pat. No. 5,084,135.

TECHNICAL FIELD

This invention relates to recycling, and more particularly, to a method for recovering paper and polyethylene, from plastic coated waste generated by a primary or secondary hydropulper, and for recovering polymeric film from plastic waste mixed with paper and other contaminants.

BACKGROUND OF THE INVENTION

The use of high viscosity, low density polyethylene as a coating material for paper products such as milk cartons is well known. During the manufacture of such plastic coated paper products, a variety of virgin scrap material such as roll ends, clippings and off-spec product is produced. This virgin scrap material is distinguished from post-consumer scrap that is subject to a greater degree of contamination.

Because of the relatively high quality of the bleached paper in the virgin scrap material, it is economically advantageous to reclaim it for use in products such as molded paper cups, trays, plates, egg cartons, and the like. Prior to reuse of the virgin scrap material, however, the polyethylene coating is desirably removed. In the first instance, this is done by grinding up the scrap and running it through a hydropulper.

In a hydropulper, the plastic is separated from a major portion of the paper and removed by flotation as an aqueous slurry. The plastic coating waste recovered from a hydropulper can typically comprise, for example, from about 6 to about 33 weight percent paper. The moisture content of the plastic coating waste usually varies in direct proportion to the amount of paper present in the waste because of the hydrophilic nature of paper.

In the past, the plastic coating waste from hydropulpers has been viewed as a discardable waste material. More recently, however, there has been increasing concern over the environmental impact of dumping such polymeric waste. Also, as the price of virgin plastic resins has increased, attention has been given to ways of further cleaning and purifying the plastic resin present in the polymeric waste recovered from hydropulpers.

The use of solvents for recovering polyethylene from a water wet mixture of water-insoluble materials containing a major portion of polyethylene and a minor portion of cellulosic pulp fibers is disclosed, for example, in U.S. Pat. No. 3,226,343.

More recently, a process for producing substantially fiber-free polyethylene pellets from hydropulper plastic coating waste has been disclosed in U.S. Pat. No. 4,332,748. That process discloses the use of tumble drying for dewatering and fiber removal, and also the plasticization of the polyethylene followed by water injection to achieve pellet formation. The polyethylene pellets made by this process comprise less than 5 weight percent fiber, and are preferably fiber-free so that they can be blended off with virgin resin for use in conventional plastic molding and extrusion applications.

In U.S. Pat. No. 5,084,135 to Brooks, et al., issued to assignee, Advanced Environmental Recycling Technologies, Inc., a method for reclaiming plastic and cellulosic fiber from plastic coated waste was disclosed in which high purity plastic pellets comprising about five to 10 weight percent cellulosic fiber, and less than about 10 weight percent water resulted from a process in which plastic coated waste was reduced in size, subjected to flotation with agitation to separate the plastic from the cellulosic fiber. The cellulosic fiber was screened, dried, and baled, the plastic was further reduced in size, and dewatered, then the dewatered plastic was dried and rolled into plastic pellets. This process is effective and commercially advantageous for reducing paper fiber and moisture content of hydropulper plastic coating waste to a desirable level on a cost-effective commercial scale for some applications. However, there continues to be a need for improvement to permit acceptable quality pellets for composites and additional value added uses, such as injection molding and film production.

In particular, the step of separating the polymeric film from a portion of the cellulosic fiber by passing the plastic waste through at least one wash tank and further, the step of separating the polymeric film and a further portion of the cellulosic fiber by flotation with agitation, both resulted in significant contamination of the washwater and flotation water with cellulosic fibers and other contaminants. Filtration of the washwater and the flotation water for purposes of re-use and/or for purposes of environmentally safe discharge of the water was required.

Further, it has been found that the pelletizing step of the previous issued co-owned U.S. Pat. No. 5,084,135 could result in inconsistent plastic pellets due to either inadequate frictional heat buildup for economic densification during pelletization, or excessive heat buildup during pelletization and potential thermal degradation of the plastic. This process was monitored by experienced technicians on a substantially continuous basis in order to observe the pellet output and manually regulate the temperature of the pelletizer and thereby control the consistency of the rolled pellets.

Notwithstanding the processes disclosed in the prior art, however, an improved method is needed for reducing the contaminants, paper fiber, and moisture content of hydropulper plastic coating waste or polymeric film to a desirable level on a cost effective, commercial scale. More specifically, an economical and reliable method is needed for reducing the paper and moisture contents of such plastic coating waste to acceptable levels, preferably from about 5 to about 10 weight percent cellulosic fiber and less than about 10 weight water for composites, and less for film and injection molding, and for pelletizing the resultant material.

In recent years the use of plastic film grocery bags and shopping bags, often made of polymeric material such as low density polyethylene, linear low density polyethylene, and high density polyethylene, has become widespread. To alleviate possible adverse environmental impact from the disposal of such bags in landfills, efforts are now made to recycle such bags. However, bags returned by consumers frequently contain paper scraps such as sales receipts, coupons, labels, adhesive stickers, organic materials, and food waste. Problems have been encountered in trying to recover and reuse polymeric film from such postconsumer waste in place of virgin resin.

Another source of recycled polymeric film is the shrinkstretch film used in wrapping food products such as produce, meats, bakery goods, and the like. This recycled film is often mixed with organic materials or with dirt accumulated when bales are stacked or warehoused, or with paper scraps such as, for example, cash register receipts, coupons, paper labels or price stickers that are attached or adhered to the polymeric film, and an effective method of recovering and reusing such recycled scrap for the same or for different purposes is also needed.

SUMMARY OF THE INVENTION

According to the present invention, a new method is provided for reducing the cellulosic fiber and water content of hydropulper plastic coating waste, and for recovering recyclable plastic and paper. Also, the invention is directed to recovering additional film waste for composites and for additional applications. Unlike prior art processes, plastic pellets produced by the method disclosed herein are intended for use in plastic molding and extrusion operations where conventionally, virgin resins, or combinations of virgin resin and substantially fiber-free regrind or off-spec resin, are normally employed. The plastic pellets produced according to the present invention can be cost-effectively produced for use in making extruded composite products comprising a discontinuous phase of aligned cellulosic fibers dispersed in a continuous phase of polymeric resin. Further, cost-effective steps are employed for reclaiming post-consumer waste in a highly pure and substantially fiber free condition, so that polymeric film products can be produced from the recovered plastic.

According to one preferred embodiment of the invention, a method is provided for reducing the cellulosic fiber and moisture content of hydropulper plastic coating waste to less than about 10 weight percent of each without the use of solvents.

According to another preferred embodiment of the invention, a method is provided for producing polyethylene pellets comprising less than about 10 weight percent cellulosic fiber and less than about 10 weight percent water from plastic coating waste received from a hydropulper.

According to a particularly preferred embodiment of the invention, a method is provided for producing polyethylene pellets that comprise from about 5 to about 10 weight percent cellulosic fiber and less than about 8 weight percent water from hydropulper plastic coating waste.

According to another particularly preferred embodiment, a method is provided for producing high purity polyethylene pellets that comprise less than about 5 weight percent cellulose fiber and less than about 8 weight percent moisture from post-consumer polymeric films, which pellets are suitable not only for composites, but also for injection molding and polymeric film production.

According to another embodiment of the invention, a method is provided that comprises the steps of shredding polymeric waste comprising less than about 50 weight percent water; introducing the shredded waste into a water pre-wash tank; recovering an aqueous slurry comprising polymeric waste from the surface of the prewash tank; introducing the aqueous slurry of polymeric waste recovered from the pre-wash tank into a wet granulator; discharging the granulated polymeric material from the wet granulator into a wash tank; introducing the polymeric material and a portion of the washwater into a mechanical auger; discharging the polymeric material from the auger into a rinse tank; introducing a slurry of rinsed polymeric material into a separation tank; dewatering the polymeric material from the separation tank; discharging the dewatered polymeric material onto a fluid bed belt drier; discharging the dried polymeric material into a pneumatic conveyor; pneumatically transporting the dried polymeric material through a cyclone for further fiber removal; introducing the plastic material discharged from the cyclone into intermediate storage; and thereafter recovering the plastic material from intermediate storage and rolling it into pellets comprising less than about 10 weight percent water and from about 5 weight percent to about 10 weight percent cellulosic fiber. Fibrous material recovered from the separation tank and from the wash tank is preferably dewatered on a vibratory screen, dried and baled.

A further feature of Applicant's invention is a mechanical hammering, rubbing, and separating step for economically and cost-effectively dislodging and separating a portion of the cellulosic fiber and/or organic contamination mechanically, thereby reducing washwater contamination and the associated cost and complexity of the water filtration.

It is a further object in a preferred embodiment to include a step of wetting the exterior surfaces of the plastic material prior to the mechanical hammering, rubbing, and separating stage, to thereby facilitate removal of the cellulosic fiber, especially when it is in the form of paper and more particularly, paper which is adhered or otherwise bonded to the plastic material, such as labels or in the case of plastic coated paper or cardboard.

A further preferred feature of the inventive process is the step of dewatering the plastic waste or plastic film extracted from the flotation with agitation separation tank to facilitate both drying and further mechanical fiber separation. The method comprises passing the plastic waste or plastic film through a mechanical screw press to squeeze out water while rubbing the film surface so that small, clinging cellulosic fibers are rubbed off and carried away with the water. Further, to facilitate drying, the squeezed film is passed through a tumbler fluffer to break up clumps and expose the surfaces of the plastic waste or film to the heated air circulated in the drier.

In a further preferred embodiment of the invention, the step of rolling the polymeric plastic or polymeric film into pellets further includes monitoring the plastic temperature within the pelletizer. This can be uniquely done with an infrared sensor and a specially formed and located port which allows the infrared sensor beam to penetrate directly into the pelletizing chamber. The temperature can then be properly maintained and/or timely adjusted within a predetermined range for proper low heat pelletization.

BRIEF DESCRIPTION OF THE DRAWINGS

The method of the invention is further described and explained in relation to the following drawings wherein.

DESCRIPTION OF THE PREFERRED EMBODIMENTS

The feed material used in practicing one method of the invention is preferably polymeric coating waste obtained from either a primary or secondary hydropulper. Although this method of the invention is discussed herein in relation to a preferred embodiment wherein the polymeric waste material preferably comprises a major portion of high viscosity, low density polyethylene, it will be understood that other polymeric materials, such as stretch films, grocery bags, and other plastic waste materials, and combinations thereof, can also be similarly processed according to the method of the invention.

Figure 1:
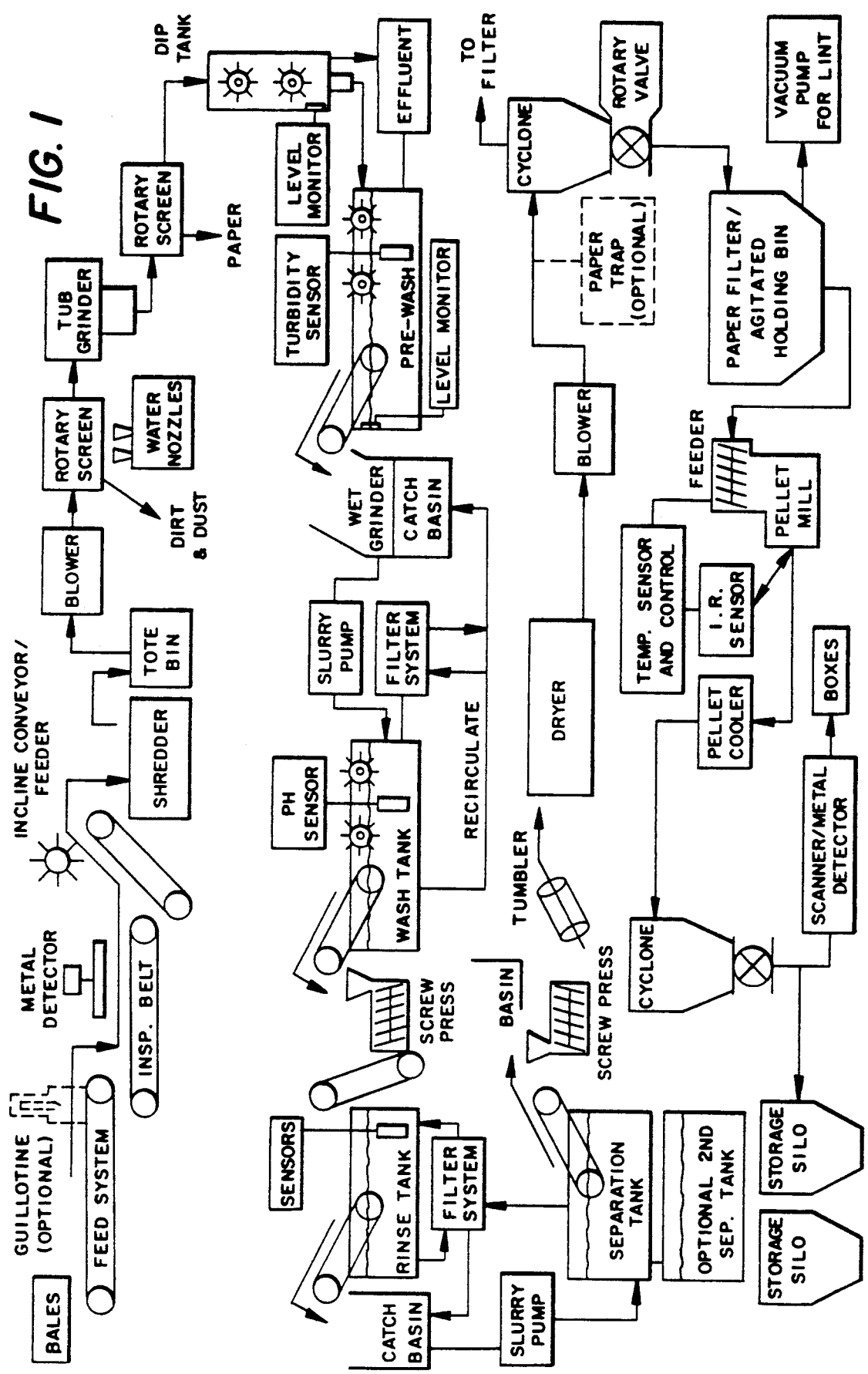
FIG. 1 depicts in simplified diagrammatic form a preferred embodiment of the method of the invention used for recycling plastic and polymeric film and for making rolled pellets from hydropulper waste or polymeric film.

Referring to FIG. 1, the polymeric coating waste feed material can take different forms, depending primarily upon the proximity of the polymeric waste recovery plant to the hydropulper from which the feed is obtained. If the hydropulper is nearby, plastic coating waste can be transferred to the polymeric waste recovery plant as an aqueous slurry. For longer hauls, the polymeric coating waste is preferably pressed and baled. Such bales typically comprise from about 40 to about 50 weight percent water due to the hydrophilic nature of the fibrous material.

If the polymeric coating waste is provided in slurry form, it is preferably introduced directly into a size reduction unit that preferably comprises counter-rotating, variable speed shafts having intermeshing radially extending members adapted to shred the material and pull the plastic from the paper. If the polymeric coating waste is provided in baled form, the bales are preferably sliced into segments approximately 6 inches wide by a hydraulically powered guillotine knife prior to introducing the material into the size reduction unit.

The counter-rotating shafts of the size reduction unit are preferably provided with spring-loaded slip clutches that will disengage if tramp waste materials not susceptible to fragmentation are encountered in the feed. According to a preferred embodiment of the invention, the size reduction unit will preferably reduce the clumps of polymeric coating waste to a size having a maximum dimension ranging between about 1 inch and about 4 inches and film waste is preferably reduced to dimensions ranging from about 1 inch to 8 inches.

From the size reduction unit, which is preferably a shredder, the feed material is conveyed to a first rotary screen or trommel for the removal of dust and dirt. If desired, a metal detector can be positioned between the shredder and the rotary screen for use in detecting pieces of metal not already removed from the feed. Further, the material is preferably conveyed with a blower which facilitates the passing of the polymeric waste film through the rotary screen while small particulate matter, such as rocks, dirt, dust, and the like, are sifted into a collection bin below the first rotary screen or trommel.

From the first rotary screen, the polymeric material is preferably discharged into an apparatus adapted for mechanically hammering and rubbing the polymeric material to separate a further portion of cellulosic material from the polymeric waste material. The mechanically hammered and rubbed material is passed through a second rotary screen to remove a further portion of the cellulosic fiber, dirt, organic matter, and/or other contaminants. Preferably, the apparatus for mechanically hammering and rubbing the shredded material is a rotary hammer similar to that found in a tub grinder. A modified tub grinder has been found to work well in this step.

In a further preferred embodiment of the hammering and rubbing step, the polymeric material film and cellulosic fiber is wetted with an amount of water sufficient to coat the surfaces of the film or plastic material. The wetted material would then be conveyed to the tub grinder to mechanically hammer and rub the wetted waste material. The moisture is absorbed by the cellulosic material and paper, facilitating breakdown of bonding between cellulosic fibers and breakdown of adhesion to the plastic. The cellulosic fiber is mechanically rubbed to form "spit balls" which can be separated and removed from the plastic.

Figure 2:
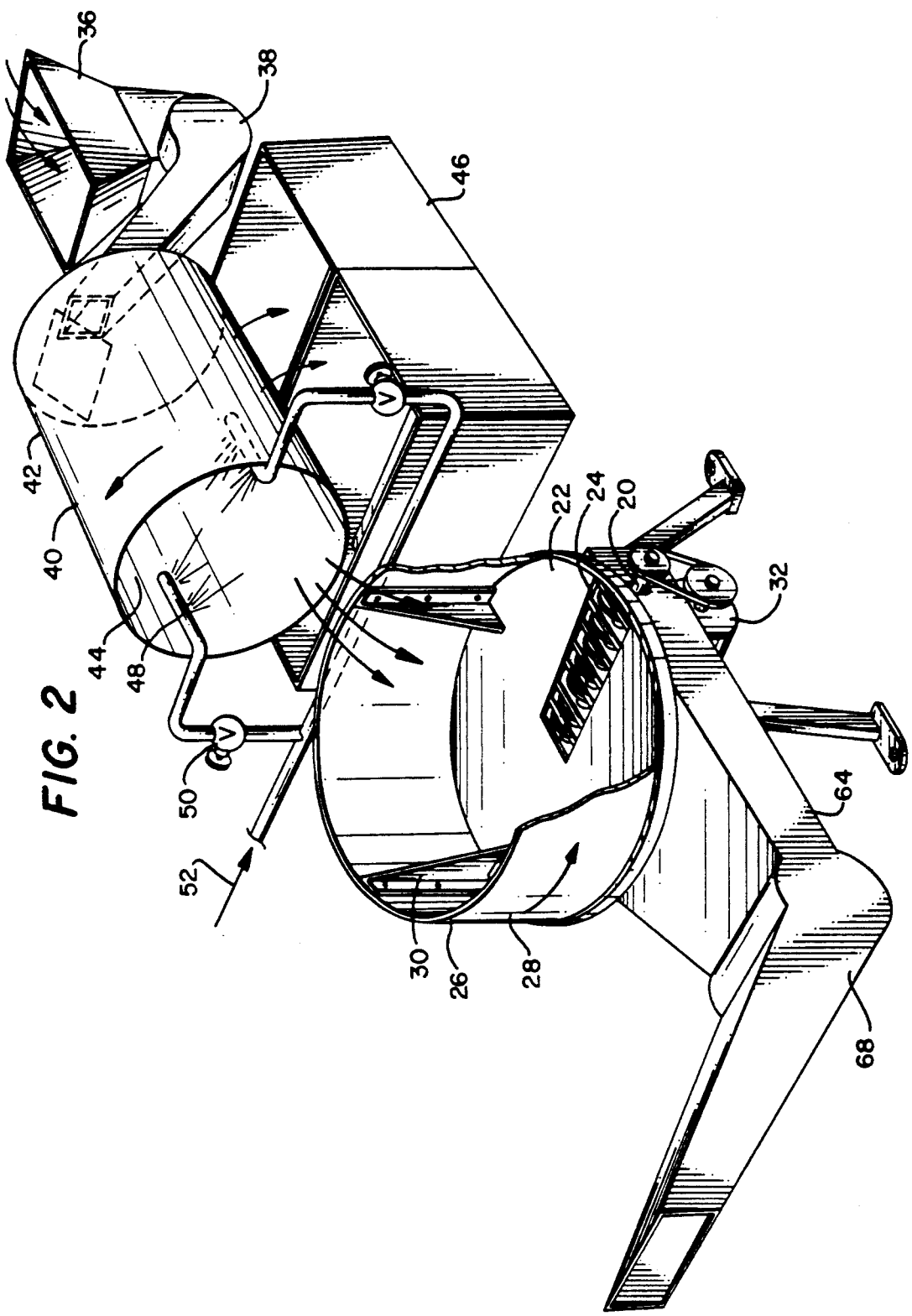
FIG. 2 depicts a schematic perspective view with partial cut-away portions of a tub grinder in the context of adjacent process components for recycling polymeric film.

In FIG. 2, a perspective view of a tub grinder showing a partial cutaway section at the rotor hammer, depicting the rotor hammer 20 in place below the tub grinder surface 22 and surface 24. The tub 26 rotates relative to the fixed base plate 22 along channel 28. Preferably, vanes 30 are attached spaced around the interior of tub 26 so that they continuously move material around and into the spaces between grate 24. The tub is driven in rotation as by a motor (not shown) and the hammer rotor shaft 20 is driven in rotation with a motor 32. In the process as depicted, plastic material is shredded in a shredder 36 and fed, via blower 38, into first portion 42 of first trommel 40, such that dirt and dust falls through the trommel screen and into bin 46. The plastic pieces are then wetted, preferably by spray nozzles 48. The nozzles 48 may be advantageously positioned in a second portion 44 of the first trommel 40 to facilitate coating all the surfaces of the plastic waste or film. While a water wash and drain stage could be used to wet the material, a spray is preferred for convenience, simplicity, conservation of space, and efficient water usage. The amount of spray can be adjusted with a valve 50 which is fed by an appropriate water supply 52.

Figure 3:
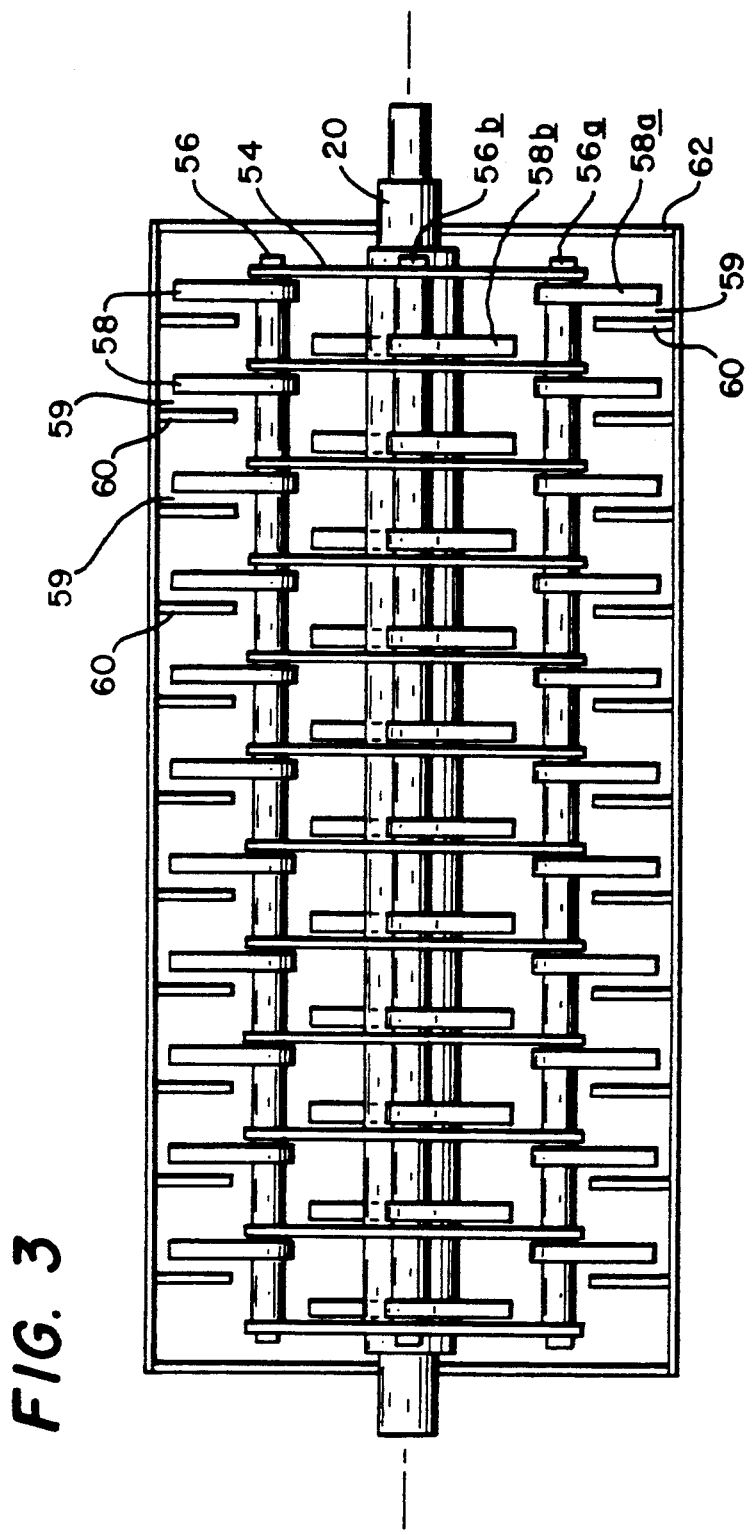
FIG. 3 depicts a schematic top plan view of a tub grinder.

As schematically depicted in FIG. 3, the rotor shaft 20 comprises rotor plates 54 to which multiple hammer shafts 56 are interconnected. Between each rotor plate 54, a hammer 58 is connected through a bushing on the hammer shaft 56. There is an offset spacing between hammers on adjacent shafts. For example, hammers 58a are preferably attached through a bushing on shaft 56a spaced apart in an opposed direction from hammers 58b on adjacent shaft 56b. This allows hammers 58a and 58b to pivot with respect to each other without direct mechanical contact. Upon rotation, hammers 58 sling generally outwardly and therefore rotate substantially at the rotational speed of the rotor shaft 20. Upon impacting material, the hammers can pivot to accommodate and move past the obstruction. Bars 60 are preferably attached spaced evenly within the casing 62 into which the rotor shaft operates. In this manner, the plastic material is continuously passed downwardly through grating 24 by the force of gravity and the air velocity caused by the rotation of the grinder rotor. The hammers pound the plastic material to loosen the cellulosic fiber, paper, or other contaminants. The close spacing 59 between the hammers 58 and the shear bars 60 rub the fiber and paper loose and into "spit balls." Spacing 59 in the range of between about ⅛ inch and 3/16 of an inch advantageously provide sufficient shear when the plastic pieces are forced therebetween to hammer, rub, and loosen adhered cellulose from the polymeric material.

In operation, the rotor hammer of the tub grinder is rotated at a speed which is sufficiently fast to result in turbulent air currents, yet sufficiently slow to vigorously rub the plastic material. It has been found that speeds for the rotating hammers of the type in a tub grinder, the tips of which rotating hammers approximately define a twenty-one (21) inch diameter circle, are advantageously adjusted to between about 1200 rpm and 2400 rpm. In round figures, this results in a maximum hammer speed of between about 110 ft./second and 220 ft./second. Rotating the hammers too fast causes tearing and breaking of the polymeric material and thereby reduces the hammering and rubbing action caused by forcing the pieces between the hammers and the shear bars. To slow results in reduced throughput and potential clogging due to insufficient air flow and turbulence. Advantageously, an optimum speed of between about 1650 and 1760 rpm (or about 150 ft./second and 160 ft./second) is used.

Where the plastic waste material has been appropriately wetted, the cellulosic fiber absorbs the moisture, which together with the manual manipulation of the tub grinder, breaks the fiber looses and causes it to become wadded, and in effect form "spit balls" which are mechanically separatable from the plastic in a subsequent rotary screen. Wetted adhesive labels as are common on polymeric film are also rubbed off and ball up. In this manner, a significant amount of the cellulosic fiber is detached and separated from the plastic in a mechanical stage with a minimum amount of water. If desired, the small amount of water can be removed to recover the cellulosic fiber by subsequent cost-effective, environmentally safe drying, as by natural evaporation. Costly and time-consuming filtration of heavily laden washwater and subsequent washing steps is reduced because less fiber is input into the wash tanks. This advantageously preserves the washwater for use removing a significantly smaller percentage of cellulosic fiber. The amount of filtration required is significantly reduced in order to re-use the water and/or to discharge it in an environmentally safe condition.

Thus, the material is hammered, rubbed, and mechanically manipulated to cause separation of cellulosic fiber, pieces of paper, and adhesive labels from the plastic. The material is then passed onward, as through a chute 64 in FIG. 2, and is conveyed as through a blower 68 to the next processing step, which will preferably be a second rotary screen for a tumbling action, and which facilitates further "spit ball" formation, and for separating and removing the "spit balls" of cellulosic fiber from the plastic. The second rotary screen is constructed similar to the first rotary screen to convey the polymeric material through to the next step while separating the heavier and smaller cellulosic fiber much of which will be in the form of wet "spit balls" which fall through the screen and are collected below.

The polymeric coating waste or the film pieces are preferably discharged from the second rotary screen into a wash tank. In the wash tank, further separation of plastic from paper is achieved, preferably through the combined use of agitation and water circulation. In the wash tank, paper, grit and tramp matter tend to settle to the bottom, while the plastic material floats to the surface and is removed, preferably by a rotating paddle wheel. Detergents or surfactants may advantageously be added to the wash tank to facilitate removal of contaminants.

According to a particularly preferred embodiment of the invention for polymeric coating waste recovery, the plastic material recovered from the wash tank is further classified or divided into light and heavy fractions. Light fractions will generally contain less than about 10 weight percent paper, and heavy fractions will generally contain greater than about 10 weight percent paper.

Light fractions of plastic material are preferably fed into a wet granulator comprising blades adapted to agitate and wash the plastic while further reducing the particle size to a maximum dimension of about ⅛ inch. A stainless steel Black-Friar granulator can be satisfactorily utilized as the wet granulator in practicing the method of the invention. After wet granulation, the plastic material is dewatered, preferably through use of an upwardly inclined auger or dewatering belt, adapted to drain away excess water.

Heavy fractions of plastic material discharged from the wash tank are preferably fed through a diverter valve into a dual attrition disk mill that is adjustable as to rotational speed and spacing. Inside the disk mill, further separation of paper from plastic is achieved as the slurry is ground against internal pads and the average particle size is reduced to a maximum dimension of about ¼ inch.

The slurry discharged from the disk mill is preferably injected by a slurry pump into the bottom of an oval-shaped separation tank having a longitudinally disposed baffle around which the aqueous slurry is circulated. Liberated plastic material floats to the top, is skimmed away, and is preferably fed to the dewatering auger in the same manner as previously discussed for light fractions.

Paper which settles to the bottom of the separation tank is preferably recovered by an inclined conveyor, dewatered, dried and baled. According to a preferred embodiment of the invention, the paper recovered from the separation tank is dewatered on a vibratory screener, optionally run through a filter press, and dried in a steam tube drier. The dried paper can then be stored in a holding bin until such time as enough paper has been accumulated to warrant baling. Paper recovered from the wash tank can also be fed to the vibratory screener, dried and baled in a similar manner if desired.

Dewatered light and heavy fractions are preferably passed from the dewatering auger or dewatering belt into a screw press which not only squeezes out the water but also further dislodges cellulosic fiber through a rubbing action between the screw press blades, the pieces of plastic, and the surrounding screen. The water and entrained fiber is drained away and processed for paper and water recovery or discharge. Preferably, the screw press has adjustable back pressure on the discharge orifice to optimize dewatering and throughput. Thus, the screw press advantageously facilitates both dewatering and further mechanical rubbing and removal of fine cellulosic fiber from the plastic material. The moisture content of plastic coated hydropulper waste after the screw press will be advantageously below about 45% and preferably below about 40% by weight.

The substantially dewatered plastic is provided into a fluffer fan which disperses and separates the plastic material which had been clumped together in the screw press. The fluffer advantageously separates such materials so that the surfaces are exposed. The dispersed and "fluffed" plastic material is then passed through an air circulation drier, so that efficient and cost-effective drying can occur.

According to a preferred embodiment of the invention, the air circulation drier comprises a fluid bed drier or a fluidized bed belt drier having variable speeds, and a gas-fired blower adapted to circulate air heated to a temperature of up to about 180 degrees F. through the perforations in the belt, and further comprises a plurality of longitudinally spaced paddles extending transversely across the belt which help to carry the drying plastic along the belt while the plastic is subjected to an upwardly directed flow of hot air. Plastic material discharged from the fluid bed drier will preferably comprise less than about 10 weight percent water, most preferably, less than about 8 weight percent water.

From the fluid bed drier, the plastic material is preferably pneumatically transported to a cyclone separator where any remaining free waste fiber is removed. The plastic material is preferably discharged from the cyclone separator into an intermediate storage bin, where it is held until pelletized.

As used herein, the term "pelletized" refers to the manufacture of rolled pellets rather than extruded plastic pellets of the type ordinarily referred to in connection with virgin resins. The dried, reclaimed plastic material is preferably transported from intermediate storage and is fed to the pelletizer by a screw-type feeder. A low heat Sprout Waldron pellet mill can be satisfactorily used in pelletizing the plastic material recovered according to the process disclosed herein, and will minimize heat and physical degradation of the polymer.

It has been found that with a low heat pellet mill, plastic pellets can be successfully fashioned if the operating temperature of the plastic material at the point of rolling the pellets is maintained at approximately 170° to 220° F. Temperatures below that range result in inadequately loose molding of the pellets so that upon cooling, they are easily fracturable into smaller pieces or into a particulate material. Alternately, temperatures above that range result in a melting of the plastic, which can result in a malfunction of the roller, including melted pellets and/or melted plastic sticking to the interior parts of the pellet mill. This can eventually lead to a plastic buildup, which may require a complete shutdown of the machinery for cleaning out the melted plastic. Previously, this process had been monitored by close observation of the pellets as they exit. The conditions of the pellet mill were adjusted to maintain properly formed output pellets. While it has been found that temperature is the condition having a primary impact on proper pellet formation, other conditions indirectly affect the temperature. For example, one might adjust to a faster feed rate where the pellets are exhibiting characteristics of melting. This, in effect, provides more material to carry the heat away from the pelletizer, so that heat buildup is reduced. Alternatively, a circulatory cooling system or a fan directed at the pellet forming die of the pelletizer may be used as through a thermostat monitor, such as an infrared temperature sensor to regulate the temperature. Previously, careful observation by trained technicians usually resulted in successful operation in this manner. However, it is time-consuming, costly, and difficult to continuously observe the pellets as they are exiting, and to adjust the parameters of the mill in a timely fashion to avoid significant quantities of improperly formed pellets. Unless adequate storage of separated plastic was provided, shutdown of the pelletizer could cause shutdown of the entire continuous plastic recovery process in order to clean the pelletizer and reestablish a steady state pelletizing condition.

This problem has uniquely and advantageously been overcome with the additional step of directly detecting the temperature of the material within the pelletizer. Preferably, this is accomplished using an infrared temperature detector with an appropriate access port formed at a location in the pelletizer which allows the infrared sensor beam to penetrate into the "heart" of the pelletizer machine, to the point at which formed pellets are discharged from the die. In this manner, the temperature of the plastic material and the die can be detected at the critical point of pellet forming. In this manner, the appropriate temperature can be easily maintained and promptly adjusted. The time delay between observing pellets exhibiting the consequences of either too high or too low of an operating temperature is advantageously reduced. In one embodiment, the temperature is continuously displayed on a monitor or digital display so that the operator can properly adjust the operating parameters of the pellet mill. In another embodiment, the signal from the infrared sensor can be directly connected as through a thermostat, electronic controls, or automatic controls of the parameters of the pellet mill. A signal from the temperature sensor might also be carried to a remote central process control computer for remote control of the pellet mill parameters.

The polymeric pellets (primarily high viscosity, low density polyethylene) produced according to the present process will preferably comprise less than about 10 weight percent, and most preferably about 5 weight percent cellulosic fiber. The processing required to achieve fiber contents of less than about 5 weight percent is generally not cost effective, and is not desirable when the plastic pellets are to be used in the production of extruded composites. In such composites, the minor portion of cellulosic fiber present in the plastic functions as a filler material that, when properly processed, can significantly increase the strength of the resultant extrudate.

Through use of the process disclosed herein, it is therefore possible to economically produce a useful polymeric product from previously discarded plastic coating waste and to simultaneously increase the percentage of paper recovered from coated paper scrap. An ancillary benefit of the subject process is a reduction in the need for wood that is achieved when the fiber-containing plastic pellets produced hereby are subsequently utilized in the production of composite building materials that can be substituted for natural wood products.

According to another preferred embodiment of the invention, as described in relation to FIG. 1, polymeric material is recovered, preferably in the form of rolled pellets, from mixed waste containing polymeric film and minor amounts of other materials, including cellulosic material such as paper, and the like. The process can sufficiently reduce the contamination level of recycled plastic films for recovery and re-use in the production of film, or for injection molding, or other plastic end products where only very low levels of contaminants can be tolerated.

Referring to FIG. 1, bales of industrial or post-consumer waste comprising a major portion of polymeric film are placed on a feed system conveyor and, if needed or desired, cut into sections by a guillotine knife or other similarly effective device. The feed material is preferably spread over an inspection conveyor belt that permits visual inspection to identify any large object or material in the feed that should be removed prior to further processing. The inspection conveyor preferably comprises a metal detector adapted to detect any metal scraps in the feed that might damage the downstream equipment.

From the inspection conveyor, the material is carried to a shredder such as the counter-rotating size reduction unit previously described in relation to FIG. 1. According to a preferred embodiment of the invention, the size reduction unit will reduce the clumps of polymeric film waste to a size having a maximum dimension ranging between about 1 inch and about 4 inches.

From the size reduction unit, which is preferably a shredder, the feed material is conveyed to a rotary screen for the removal of dust and dirt. If desired, a metal detector can be positioned between the shredder and the rotary screen for use in detecting pieces of metal not already removed from the feed. Further, the material is preferably conveyed with a blower which facilitates the passing of the polymeric waste film through the rotary screen while small particulate matter, such as rocks, dirt, dust, and the like, are sifted into a collection bin by a first portion of the rotary screen or trommel.

From the rotary screen, the polymeric material is preferably discharged into a tub grinder adapted to mechanically separate a further portion of cellulosic material from the polymeric film waste material as described above with respect to hydropulper plastic coating waste.

In a further preferred embodiment, the polymeric material film and cellulosic fiber or labels as may continue to be adhered thereto, is wetted with a spray or mist with an amount of water sufficient to coat the surfaces of the shredded film or plastic material. The wetted material would then be conveyed to the tub grinder to mechanically hammer and rub the waste material thereby dislodging the cellulosic material and paper facilitating removing the cellulosic fiber as described above in connection with FIGS. 2 and 3.

The polymeric film is preferably discharged from the second rotary screen into a dip tank which dips the material under the water. The material is thoroughly soaked or wetted. Partial removal of clumps of contaminants results from complete wetting or soaking and advantageously reduces the load on subsequent wash tanks. A pre-wash tank may also receive the material from the dip tank to further remove contaminants.

From the dip tank and/or pre-wash tank, the wet polymeric film is preferably introduced into a wet grinder or granulator adapted to agitate and wash the plastic while further reducing the particle size to a maximum dimension of about ½ inch. The polymeric film waste is preferably discharged from the wet grinder or granulator into a wash tank in which further separation of polymeric film from paper is achieved, preferably through the combined use of agitation and water circulation. Preferably, the slurry is discharged into the wash tank below the water and near the bottom to facilitate washing. In the wash tank, paper and other waste matter having a density greater than that of the polymeric film tend to settle to the bottom, while the polymeric film material floats to the surface and is removed, preferably by a rotating paddle wheel. If desired, additives such as cleaning agents, detergents, surfactants, or the like, can be advantageously used in the wash tank to aid in cleaning the polymeric film, especially for purposes of obtaining a high purity end product. Following the wash tank, a rinse tank is preferably provided. The use of a rinse tank is especially desirable where detergents or other cleaning agents are used in the wash tank.

From the rinse tank, the material is preferably charged by a slurry pump into an oval-shaped separation tank having a longitudinally disposed baffle around which the aqueous slurry is circulated. Preferably, the slurry pump discharges under water and at or near the bottom of the separation tank. This advantageously facilitates total immersion and flotation separation. The separation tank preferably comprises a recirculating aqueous fluid comprising such additives as may be desired such as, for example, chlorine to prevent algae growth or soluble polymers that facilitate separation of the paper and polymeric film.

Paper scraps or other remaining particulate contaminants having a density greater than that of the aqueous fluid in the separation tank desirably sink to collection sumps in the bottom of the tank, and the polymeric film material floats to the top, where it is skimmed away. If needed in order to obtain the desired degree of separation, another separation tank can be provided to remove additional amounts of paper or other contaminants.

After exiting the separation tank or tanks, the polymeric film is dewatered, preferably with a screw press, or an auger or screen belt, in combination, with a screw press. In the case of polymeric film, it has been found that the mechanical rubbing of the screw press is particularly advantageous over a roller press. The roller press did little to further dislodge fine fiber trapped in water between the pieces of polymeric film. The screw press acts to slide the pieces with respect to each other, so that the fine fibers are more fully removed. The squeezing pressure at the outlet is preferably adjustable as by adjusting the opening at the exit orifice. Plastic film having a moisture content of below about 45% and preferably between about 29% and 31% can be advantageously achieved using a screw press.

The plastic film is transported, as by conveyor to a drier. It is particularly advantageous in the case of polymeric film that the conveyor or a portion of the conveyor is a fluffer fan or tumbler which disperses the packed together film pieces. It has been found that film traps contaminants inside or between it due to its high amount of surface area per weight. This exposes all the moisture laden surfaces of the film for drying and for mechanical agitation against a screen. It has been found that moisture might otherwise be "sandwiched" and trapped between other layers of polymeric film pieces. As before, the film is then dried in an air circulation belt drier. Material discharged from the drier will preferably comprise less than about 10 weight percent water, and most preferably, less than about 8 weight percent water or moisture.

From the drier, the polymeric film is preferably pneumatically transported to a cyclone separator where any remaining free waste fiber is removed. The polymeric material is preferably discharged from the cyclone separator into an intermediate storage bin, where it is held until pelletized as previously discussed in relation to FIG. 1 above. Also, the infrared sensor can be advantageously used in the pelletizing process as described above.

Other alterations, modifications and uses of the invention disclosed herein will likewise become apparent to those of ordinary skill in the art upon reading the present disclosure, and it is intended that the scope of the invention be limited only by the broadest interpretation of the appended claims to which the inventor is legally entitled.

We claim:

1. A method for reclaiming plastic from hydropulper plastic coated waste, comprising plastic and cellulosic fiber, said method comprising the steps of:
   (a) introducing the plastic coated waste into a size reduction unit and reducing the plastic coated waste to particles having a maximum dimension ranging between about 1 inch and about 4 inches;
   (b) mechanically hammering, rubbing, and separating a portion of the cellulosic fiber from the hydropulper plastic coated waste;
   (c) separating the plastic and another portion of the cellulosic fiber by flotation with agitation;
   (d) further reducing the particle size of the plastic to a maximum dimension of about ½ inch;
   (e) dewatering the plastic; and
   (f) drying the plastic to a moisture content of less than about 10 weight percent.

2. The method of claim 1 wherein the step of mechanically hammering, rubbing, and separating a portion of the cellulosic fiber from the plastic includes the step of passing the plastic coated waste through a tub grinder.

3. The method of claim 2 wherein the step of mechanically hammering, rubbing, and separating a portion of the cellulosic fiber from the plastic further includes the step of adjusting the speed of the tub grinder hammers so that the maximum velocity of the hammers is in a range of between about 110 ft./second and 220 ft./second.

4. The method of claim 3 in which the speed of the tub grinder is adjusted so that the average maximum hammer speed is between about 150 ft./second and 160 ft./second.

5. The method of claim 1 further comprising the step of wetting the hydropulper waste produce with a sufficient amount of water to cover the exposed surfaces and so that the wetted hydropulper waste material is acted upon in the mechanical hammering, rubbing, and separating step to thereby facilitate separation and removal of the cellulosic fiber from the plastic material.

6. The method of claim 1 wherein the step of dewatering the plastic material further comprises the steps of passing the plastic material through a screw press, draining off the water and entrained cellulosic fiber, and passing the dewatered plastic through a fluffer fan.

7. The method of claim 1 further comprising the steps of rolling the polymeric film into pellets, detecting the temperature of the pellets as they are rolled, and adjusting the temperature to maintain proper rolled pellet formation.

8. A method for reclaiming plastic from polymeric film, comprising plastic and cellulosic fiber, said method comprising the steps of:
   (a) introducing the polymeric film into a size reduction unit and reducing the polymeric film to particles having a maximum dimension ranging between about 1 inch and about 8 inches;
   (b) mechanically hammering, rubbing, and separating a portion of the cellulosic fiber from the polymeric film;
   (c) separating the plastic and another portion of the cellulosic fiber by flotation with agitation;
   (d) further reducing the particle size of the plastic to a maximum dimension of about ½ inch; and
   (e) dewatering the plastic;
   (f) drying the plastic to a moisture content of less than about 10 weight percent.

9. The method of claim 8 wherein the step of mechanically hammering, rubbing, and separating a portion of the cellulosic fiber from the plastic includes the step of passing the polymeric film through a tub grinder.

10. The method of claim 9 wherein the step of mechanically hammering, rubbing, and separating a portion of the cellulosic fiber from the plastic further includes the step of adjusting the speed of the tub grinder hammers so that the maximum velocity of the hammers is in a range of between about 110 ft./second and 220 ft./second.

11. The method of claim 10 in which the speed of the tub grinder is adjusted so that the average maximum hammer speed is between about 150 ft./second and 160 ft./second.

12. The method of claim 8 further comprising the step of wetting the polymeric film product with a sufficient amount of water to cover the exposed surfaces and so that the wetted polymeric film is acted upon in the mechanical hammering, rubbing, and separating step to thereby facilitate separation and removal of the cellulosic fiber from the plastic material.

13. The method of claim 8 wherein the step of dewatering the plastic material further comprises the steps of passing the plastic material through a screw press, draining off the water and entrained cellulosic fiber, and passing the dewatered plastic through a fluffer fan.

14. The method of claim 8 further comprising the steps of rolling the polymeric film into pellets detecting the temperature of the pellets as they are rolled, and adjusting the temperature to maintain proper rolled pellet formation.

* * * * *